(12) United States Patent
El-Deeb et al.

(10) Patent No.: US 12,458,607 B2
(45) Date of Patent: Nov. 4, 2025

(54) ADHESIVE PAD

(71) Applicant: Myospots Australia Pty Ltd, Robina (AU)

(72) Inventors: Ibrahim Mustafa El-Deeb, Benowa (AU); Shehab Faragallah, Robina (AU)

(73) Assignee: MYOSPOTS AUSTRALIA PTY LTD, Robina (AU)

( * ) Notice: Subject to any disclaimer, the term of this patent is extended or adjusted under 35 U.S.C. 154(b) by 569 days.

(21) Appl. No.: 17/298,408

(22) PCT Filed: Dec. 10, 2019

(86) PCT No.: PCT/AU2019/051352
§ 371 (c)(1),
(2) Date: May 28, 2021

(87) PCT Pub. No.: WO2020/118358
PCT Pub. Date: Jun. 18, 2020

(65) Prior Publication Data
US 2022/0117908 A1 Apr. 21, 2022

(30) Foreign Application Priority Data

Dec. 11, 2018 (AU) ................. 2018904706
Jan. 31, 2019 (AU) ................. 2019900290
Jul. 11, 2019 (AU) ................. 2019902458

(51) Int. Cl.
| | | |
|---|---|---|
| *A61K 9/70* | (2006.01) | |
| *A61K 9/00* | (2006.01) | |
| *A61K 31/375* | (2006.01) | |
| *A61K 31/593* | (2006.01) | |
| *A61K 33/30* | (2006.01) | |
| *A61K 47/36* | (2006.01) | |
| *A61K 47/38* | (2006.01) | |
| *A61K 47/42* | (2017.01) | |

(52) U.S. Cl.
CPC ........... *A61K 9/7046* (2013.01); *A61K 9/006* (2013.01); *A61K 31/375* (2013.01); *A61K 31/593* (2013.01); *A61K 33/30* (2013.01); *A61K 47/36* (2013.01); *A61K 47/38* (2013.01); *A61K 47/42* (2013.01)

(58) Field of Classification Search
None
See application file for complete search history.

(56) References Cited

U.S. PATENT DOCUMENTS

| | | |
|---|---|---|
| 4,293,301 A | 10/1981 | Mattsson |
| 8,647,314 B2 | 2/2014 | Asmussen et al. |
| 2008/0096924 A1* | 4/2008 | Masuda ............... A61P 29/00 546/209 |
| 2009/0053309 A1* | 2/2009 | Domb ................ A61K 9/006 424/464 |
| 2010/0184566 A1 | 7/2010 | Munehiro |
| 2016/0128947 A1* | 5/2016 | McConville ........... B29B 13/00 424/443 |
| 2017/0027738 A1 | 2/2017 | Van |
| 2017/0100328 A1 | 4/2017 | Kovarik |
| 2018/0035730 A1 | 2/2018 | Michalak |

FOREIGN PATENT DOCUMENTS

| | | | |
|---|---|---|---|
| EP | 3409199 A1 | 12/2018 | |
| JP | 2012-072166 A | 4/2012 | |
| JP | 2015-051982 A | 3/2015 | |
| KR | 2020110009880 U | 10/2011 | |
| RU | 2010 114 710 A | 10/2011 | |
| TW | 201707691 A | 3/2017 | |
| TW | 201707691 A1 | 3/2017 | |
| WO | 2000042992 A2 | 7/2000 | |
| WO | 200211651 A1 | 2/2002 | |
| WO | 2004045537 A2 | 6/2004 | |
| WO | 2014074503 A1 | 5/2014 | |
| WO | WO-2017146104 A1 * | 8/2017 | ............. A61K 45/00 |
| WO | WO-2018029671 A1 * | 2/2018 | ........... A61K 31/131 |

OTHER PUBLICATIONS

Juliano et al., Mucoadhesive alginate matrices containing sodium carboxymethyl starch for buccal delivery: in vitro and in vivo studies, 2004, Journal of Drug Delivery Science and Technology, 14(2), 159-163, DOI: 10.1016/S1773-2247(04)50029-1 (Year: 2004).*
Miyazaki et al., Oral mucosal bioadhesive tablets of pectin and HPMC: in vitro and in vivo evaluation, 2000, International Journal of Pharmaceutics, 204(102), 127-132, DOI: 10.1016/S0378-5173(00)00491-9 (Year: 2000).*
Sigal, S. et al., "Sticky Tape—Helpful for Carryover of S and Z Production and Eliminating Tongue Thrust", leader. pubs.asha.org/do/10.1044/sticky-tape-helpful-for-carryover-of-s-and-z-production-and-eliminating-tongue-thrust/full, Jul. 11, 2011 (Year: 2011).*
Fini et al., Mucoadhesive Gels Designed for the Controlled Release of Chlorhexidine in the Oral Cavity, 2011, Pharmaceutics, 3(4), 665-679, DOI: 10.3390/pharmaceutics3040665 (Year: 2011).*
Bayrak et al., Formulation of zolmitriptan sublingual tablets prepared by direct compression with different polymers: In vitro and in vivo evaluation, 2011, European Journal of Pharmaceutics and Biopharmaceutics, 78(3), 499-505, DOI: 10.1016/j.ejpb.2011.02.014 (Year: 2011).*
U.S. Pharmacopeia "Carboxymethylcellulose Sodium 12" (http://www.pharmacopeia.cn/v29240/usp29nf24s0_m13255.html#; accessed Jun. 5, 2023) (Year: 2023).*
English Google Patents Translation of WO 2017/146104 A1, 7 pages (Year: 2017).*
International Search Report of International Patent Application No. PCT/AU2019/051352 mailed Mar. 3, 2020.

(Continued)

Primary Examiner — Aradhana Sasan
(74) Attorney, Agent, or Firm — McBee, Moore & Vanik IP, LLC (57) ABSTRACT

The present invention relates to an adhesive pad for myofunctional training comprising a carboxymethyl cellulose or alkali metal derivative thereof; and one or more hydrocolloids selected from the group consisting of starch, polysaccharides, gelatin and gums. The adhesive pad may alleviate the problems associate with abnormal tongue posture and/or movement.

14 Claims, 5 Drawing Sheets

(56) References Cited

OTHER PUBLICATIONS

Sigal, S. et al., "Sticky Tape—Helpful for Carryover of S and Z Production and Eliminating Tongue Thrust", leader. pubs.asha.org/do/10.1044/sticky-tape-helpful-for-carryover-of-s-and-z-production-and-eliminating-tongue-thrust/full,Jul. 11, 2011.
Sticky Spot, Myo Made Easy, Myofunctional Therapy Products and Supplies, myomadeeasy.com/product/sticky-spot.
Dahiya et al., "A Review on Mouth Dissolving Films," Current Drug Delivery, 2009, vol. 6, pp. 469-476.
Goel et al., "Orally Disintegrating Systems: Innovations in Formulation and Technology," Recent Patents on Drug Delivery & Formulation, 2008, pp. 258-274, XP-002545408.

\* cited by examiner

After 1 minute | After 72 minutes | After 104 minutes

FIG 3

After 1 minute | After 58 minutes | After 93 minutes

ADHESIVE PAD

FIELD OF THE INVENTION

The present invention relates to the field of medical treatment. More particularly, the invention relates to an adhesive pad. Most particularly, the invention relates to an adhesive pad for use in myofunctional training.

BACKGROUND TO THE INVENTION

Any reference to background art herein is not to be construed as an admission that such art constitutes common general knowledge in Australia or elsewhere.

The tongue plays a significant part in our day-to-day lives. It is used for tasting, swallowing and articulating speech. However, abnormal tongue posture and/or movement can also lead to significant problems, such as malocclusion, teeth displacement, dysphagia, snoring and issues with speech.

The positioning, posture and/or movement of the tongue is crucial. The placement of the tongue against the palate is important in the development of the maxilla and prevents the muscles of facial expression from moving during swallowing. Furthermore, overuse of these muscles during swallowing or resting can contribute to oral malocclusion. It is believed that the tongue deviating from the desired posture can lead to significant downstream issues. In this regard, myofunctional disorder can arise from an abnormal tongue position during rest, swallowing and/or speech.

Myofunctional disorder can result in a number of downstream problems. For instance, tongue thrust is when the tongue sits between the mandibular and maxillary teeth and protrudes beyond the anterior teeth into the lip area. This can result in an anterior open bite malocclusion.

Furthermore, myofunctional disorder can result in excess mouth-breathing. In this regard, mouth-breathing can result in a number of health consequences. For instance, mouth-breathing plays a critical role in asthma and can increase the risk of mouth and throat infections. Additionally, mouth-breathing can lead to pollutants and germs being drawn directly into the lungs. Snoring and sleep apnoea are also linked to mouth-breathing. In this regard, during sleep, the mouth may remain open and the mandibles cause the soft tissue (including the tongue) to collapse the airway. Tongue placement during sleep can play a significant role in promoting and alleviating mouth-breathing.

Tongue exercises are believed to treat many of the underlying causes of the above issues, and these tongue exercises are known as myofunctional therapy or training. As such, myofunctional training can play an important role in alleviating the above problems. By training the tongue to have a desired posture, many of the above issues can be alleviated.

Myofunctional training can also assist in treating an anterior open bite. In this regard, when the tongue rests against the palate it can expand the maxilla by applying a slow and consistent force to the tongue side surfaces of the teeth, and this can assist in the treatment of crooked teeth.

It will be appreciated that it would be advantageous to alleviate the above problems. For instance, it would be advantageous to alleviate the problem of the tongue deviating from the desired positioning, posture and/or movement. Alternatively, it would be useful to provide a commercial alternative to the methods of treatment currently available.

SUMMARY OF THE INVENTION

In one form, although it need not be the only or indeed the broadest form, the invention resides in an adhesive pad for myofunctional training comprising:
  cellulose; and
  one or more hydrocolloids selected from the group consisting of starch, polysaccharides, gelatin and gums.

In a second form, the invention resides in a method of myofunctionally training a subject including the steps of:
  a. providing an adhesive pad comprising one or more hydrocolloids selected from the group consisting of cellulose, starch, polysaccharides, gelatin and gums; and
  b. adhering the adhesive pad to a surface in an oral cavity of the subject;
  to myofunctionally train the subject.

In an embodiment, the adhesive pad comprises cellulose; and one or more hydrocolloids selected from the group consisting of starch, polysaccharides, gelatin and gums.

In one embodiment, the cellulose is a carboxymethyl cellulose or alkali metal derivative thereof.

In a third form, the invention resides in a method of myofunctionally training a subject including the steps of:
  a. providing an adhesive pad comprising one or more hydrocolloids selected from the group consisting of cellulose, starch, polysaccharides, gelatin and gums; and
  b. adhering the adhesive pad to a surface of an oral appliance or device;
  to thereby myofunctionally train the subject.

In an embodiment, the adhesive pad comprises cellulose; and one or more hydrocolloids selected from the group consisting of starch, polysaccharides, gelatin and gums In one embodiment, the cellulose is a carboxymethyl cellulose or alkali metal derivative thereof.

The various features and embodiments of the present invention referred to in the individual sections above and in the description which follows apply, as appropriate, to other sections, mutatis mutandis. Consequently, features specified in one section may be combined with features specified in other sections as appropriate.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Embodiments of the present invention reside primarily in an adhesive pad. Accordingly, the article and method steps have been illustrated in concise schematic form in the drawings, showing only those specific details that are necessary for understanding the embodiments of the present invention, so as not to obscure the disclosure with excessive detail that will be readily apparent to the person skilled in the art having the benefit of the present description.

In this specification, adjectives such as one or more, at least, top, bottom, side, and the like may be used solely to distinguish one element or action from another element or action without necessarily requiring or implying any actual such relationship or order.

Words such as "comprises" or "includes" are intended to define a non-exclusive inclusion, such that an article or method that comprises a list of elements does not include only those elements but may include other elements not expressly listed, including elements that are inherent to such an article or method.

As used herein, the term 'about' means the amount is nominally the number following the term 'about' but the actual amount may vary from this precise number to an unimportant degree.

As used herein, the term 'oral cavity' refers to the cavity of the mouth. The 'oral cavity' includes, but are not limited to, the buccal cavity, the palatal surface (the roof of the mouth), the floor of the mouth, the gum, the check, the incisive papillae and the lips.

The present invention resides in an adhesive pad. The present invention is predicated on, at least, the finding that the adhesive pad of the first aspect can advantageously adhere to moist body surfaces such as the oral cavity. The adhesive pad may be used intra-orally. The adhesive pad may be applied onto the palate, the upper or lower gum, between the gum and cheek, between the gum and lips or under the tongue of the subject. The present adhesive pad can also be slowly dissolved over a period of time. Furthermore, the adhesive pads can be easily manufactured and are relatively inexpensive.

In a first aspect, the invention resides in an adhesive pad for myofunctional training comprising:
cellulose; and
one or more hydrocolloids selected from the group consisting of starch, polysaccharides, gelatin and gums.

The adhesive pad is preferably safe for internal human use. As such, the components of the adhesive pad are preferably non-toxic and do not have any adverse effects on the subject. In an embodiment, the adhesive pad is non-toxic. In one embodiment, the adhesive pad is biodegradable.

As used herein, the term 'cellulose' includes cellulose and semisynthetic cellulose, and derivatives thereof. Non-limiting examples of cellulose include carboxymethyl cellulose, alkyl cellulose and/or alkali metal derivatives thereof. Non-limiting examples of the alkyl cellulose include hydroxyalkyl cellulose. Non-limiting examples of the hydroxyalkyl cellulose include hydroxyethyl cellulose and hydroxypropyl cellulose. Non-limiting examples of alkyl celluloses include methylcellulose, and ethylcellulose.

The alkali metal may suitably be selected from the group consisting of sodium and potassium. In one embodiment, the carboxymethyl cellulose is sodium carboxymethyl cellulose.

The % by weight amount of the cellulose in the adhesive pad is suitably between about 5% and about 50%, more suitably between about 10% and about 40%, preferably between about 15% and about 35%, and most preferably selected from about 15%, about 20%, about 25%, about 30% and about 35%.

In one embodiment, the cellulose is carboxylmethyl cellulose or alkali metal derivative thereof.

In an embodiment, the adhesive pad comprises two or more hydrocolloids.

In one embodiment, the starch is suitably a carboxymethyl starch.

In an embodiment, the polysaccharide is suitably selected from the group consisting of agar and pectin.

In one embodiment, the gum is suitably selected from the group consisting of guar gum, karaya gum, xanthan gum, gum acacia, gum arabic, and locust bean gum. Preferably, the gum is guar gum and/or xanthan gum.

The % by weight amount of the hydrocolloid in the adhesive pad is suitably between about 5% and about 80%, more suitably between about 10% and about 70%, preferably between about 30% and about 70%, more preferably between about 35% and about 70%, and most preferably selected from about 30%, about 35%, about 40%, about 45%, about 50%, about 55%, about 60%, about 65% and about 70%. In one embodiment, the amount of the hydrocolloid in the adhesive pad is between about 30% and about 33%.

The adhesive pad may further comprise a solvent. The solvent may suitably be selected from the group consisting of water, oil and alcohol. The alcohol may suitably be an alkyl alcohol or a polyhydroxy alcohol. The polyhydroxy alcohol may suitably be selected from the group consisting of glycerol and propylene glycol. Preferably, the solvent is water, glycerol and/or propylene glycol.

In one embodiment, the solvent is an emulsion of oil in water. The emulsion of oil in water comprise saturated or unsaturated oil which is dispersed in water. The emulsion of oil in water may also comprise surface active agents such as monoglycerides, glycolipids, fatty alcohols and lecithins.

The solvent may suitably be a mixture of water and alcohol. The solvent may comprise up to 50%, up to 60%, up to 70%, up to 80%, or up to 90%, alcohol and/or polyhydroxy alcohol and the remaining amount made up with water. In an embodiment, the solvent may comprise up to 100% water In a preferred embodiment, the adhesive pad comprises a carboxymethyl cellulose or alkali metal derivative thereof; and two or more hydrocolloids selected from the group consisting of starch, polysaccharides, gelatin and gums.

In a preferred embodiment, the adhesive pad comprises a carboxymethyl cellulose or alkali metal derivative thereof, a gum and a polysaccharide.

In an embodiment, polysaccharide is selected from agar and pectin.

In an embodiment, the adhesive pad comprises a carboxymethyl cellulose or alkali metal derivative thereof; agar, pectin and/or gelatin; and a gum.

In a particularly preferred embodiment, the adhesive pad comprises a carboxymethyl cellulose or alkali metal derivative thereof; agar; and a gum. In another preferred embodiment, the adhesive pad comprises a carboxymethyl cellulose or alkali metal derivative thereof; pectin; and a gum. In yet another preferred embodiment, the adhesive pad comprises a carboxymethyl cellulose or alkali metal derivative thereof; gelatin; and a gum.

In some embodiments, the adhesive pad comprises:
sodium carboxymethyl cellulose in an amount of about 10% to about 30%, agar in an amount of about 10% to about 30%, xanthan gum in an amount of about 10% to about 30%, and glycerol in an amount of about 30% to about 50%, by weight of the adhesive pad; or
sodium carboxymethyl cellulose in an amount of about 20% to about 40%, pectin in an amount of about 25% to about 45%, and guar gum in an amount of about 25% to about 45%, by weight of the adhesive pad; or
sodium carboxymethyl cellulose in an amount of about 25% to about 45%, gelatin in an amount of about 25% to about 45%, and xanthan gum in an amount of about 20% to about 40%, by weight of the adhesive pad; or
sodium carboxymethyl cellulose in an amount of about 20% to about 40%, agar in an amount of 5% to about 25%, pectin in an amount of about 5% to about 25%, and xanthan gum in an amount of about 10% to about 30%, by weight of the adhesive pad; or
sodium carboxymethyl cellulose in an amount of about 20% to about 40%, agar in an amount of about 25% to about 45%, and guar gum in an amount of about 25% to about 45%, by weight of the adhesive pad; or
sodium carboxymethyl cellulose in an amount of about 5% to about 25%, agar in an amount of about 10% to about 30%, xanthan gum in an amount of about 5% to about 25%, and glycerol in an amount of about 35% to about 55%, by weight of the adhesive pad.

In preferred embodiments, the adhesive pad comprises:
sodium carboxymethyl cellulose in an amount of about 20%, agar in an amount of about 20%, xanthan gum in an amount of about 20%, and glycerol in an amount of about 40%, by weight of the adhesive pad; or
sodium carboxymethyl cellulose in an amount of about 30%, pectin in an amount of about 35%, and guar gum in an amount of about 35%, by weight of the adhesive pad; or
sodium carboxymethyl cellulose in an amount of about 35%, gelatin in an amount of about 35%, and xanthan gum in an amount of about 30%, by weight of the adhesive pad; or
sodium carboxymethyl cellulose in an amount of about 30%, agar in an amount of about 15%, pectin in an amount of about 15%, and xanthan gum in an amount of about 20%, by weight of the adhesive pad; or
sodium carboxymethyl cellulose in an amount of about 30%, agar in an amount of about 35%, and guar gum in an amount of about 35%, by weight of the adhesive pad; or
sodium carboxymethyl cellulose in an amount of about 15%, agar in an amount of about 20%, xanthan gum in an amount of about 15%, and glycerol in an amount of about 45%, by weight of the adhesive pad; or
sodium carboxymethyl cellulose in an amount of about 30%, agar in an amount of about 30%, xanthan gum in an amount of about 30% by weight of the adhesive pad; or
sodium carboxymethyl cellulose in an amount of about 31.5%, agar in an amount of about 31.5%, xanthan gum in an amount of about 31.5% by weight of the adhesive pad.

The adhesive pad may comprise further components that impart desirable properties thereto. In this regard, the adhesive pad may further comprise one or more of colouring agents, flavouring agents, oils, glidants and preservatives.

The colouring agents provide a desirable visual appearance to the adhesive pad. The colour is suitably a natural colouring agent or a synthetic colouring agent. Colouring agents are known in the art and suitable colouring agents will be apparent to the person skilled in the art. For instance, the colouring agents may suitably be red, blue, green or yellow. The person skilled in the art will appreciate that more than one colouring agents can be utilized. The colouring agent may be present in an amount of between about 0.1% and 10%, between about 0.5% and about 5%, between about 0.5% and about 5%, between about 1% and about 3%, between about 1% and about 2%, or about 1.2%.

The flavouring agent imparts a desirable flavor to the adhesive pad such that, in use, the subject experiences a desirable flavor sensation. The flavouring agent is suitably a natural flavouring agent or a synthetic flavouring agent. Flavouring agents are known in the art and suitable flavouring agents will be apparent to the person skilled in the art. The flavouring agent is suitably a sweetener. The flavouring agents may be selected from the group consisting of *stevia*, sucralose, xylitol, raspberry flavouring, passion fruit flavouring and lime flavouring. The person skilled in the art will appreciate that more than one flavouring agents can be utilized. The flavouring agent may be present in an amount of between about 0.1% and 20%, between about 0.5% and about 10%, between about 1% and about 7.5%, between about 1% and about 5%, between about 2% and about 3%, or about 2.5% or about 3.1%.

Oil is added to advantageously improve the elasticity of the adhesive pad. Oil also modulates the dissolution rate of the adhesive pad. The oil is suitably selected from the group consisting of coconut oil, almond oil, olive oil, and aloe vera oil. The oil may also advantageous impart flavor to the adhesive pad. The person skilled in the art will appreciate that more than one oil can be utilized.

Glidant is added to improve the flowability of a powder. A glidant can improve powder flow and reduce interparticle friction. A non-limiting example of a glidant is glyceryl dibehenate. The glidant may be present in an amount of between about 0.1% and 10%, between about 0.5% and about 5%, between about 0.5% and about 3%, between about 0.5% and about 2%, between about 0.5% and about 1.5%, or about 1%.

The preservative extends the life of the adhesive pad. Preservatives are known in the art and suitable preservatives will be apparent to the person skilled in the art. The preservative is suitably selected from the group consisting of sodium propionate, sodium benzoate, sodium nitrite, sulfur dioxide, potassium sorbate and sodium sorbate. Preferably, the preservative includes or is potassium sorbate. The preservative may be present in an amount of between about 0.01% and 10%, between about 0.01% and about 5%, between about 0.01% and about 3%, between about 0.01% and about 1%, between about 0.1% and about 0.5%, between about 0.1% and about 0.3%, or about 0.2%.

The adhesive pad may be provided in a number of forms. The adhesive pad may be provided as a solid pad. The solid pad may suitably be ready-for-use.

In one embodiment, the adhesive pad may be provided in the form of a paste. Preferably, the adhesive pad may be provided in the form of a semi-solid paste. The paste can be utilized by the consumer to shape and size the resultant pad in accordance with their preference.

In an embodiment, the adhesive pad may be provided in the form of a solid. Preferably, the adhesive pad may be provided in the form of a powder. The powder can be reconstituted in a liquid. The liquid is suitably a solvent as described hereinabove. Preferably, the liquid is selected from water, a water/alcohol mixture or a water/oil emulsion. Once reconstituted, the adhesive pad can form a paste so that the consumer can adjust the shape and size of the resultant pad.

The adhesive pad may also be utilized to deliver an active agent or medicament to the subject. In this regard, the adhesive pad may further comprise an active agent.

The active agent may be released to the subject during dissolution of the adhesive pad. In this regard, the active agent may be evenly dispersed within the adhesive pad such that the active agent is consistently and/or constantly released during dissolution.

Alternatively, the active agent may be concentrated in a specific localized region of the adhesive pad such that there is a delay in the release of the active agent. In this regard, as dissolution of the adhesive pad occurs, none or very little of the active agent is released initially and a higher amount of active agent is released as dissolution of the adhesive pad occurs.

The active agent may be a medicament that is required to be administered to the subject. The active agent may be selected from the group consisting of vitamins, minerals and gluconates. The vitamin is suitably vitamin D, vitamin B complex, vitamin E, vitamin K and/or vitamin C. The minerals can suitably be selected from any of the essential elements such as calcium, magnesium, iron, zinc, copper, manganese, selenium, molybdenum, chromium, and fluoride. The gluconate is suitably zinc gluconate. Other non-limiting examples of the active agent include antibacterial agents, antifungal agents, anti-inflammatory agents, antiviral agents, analgesics, systemic drugs such as drugs for asthma, central nervous system (CNS) active drugs, cardiovascular drugs, hormones and enzymes.

Non-limiting examples of the active agent include nicotine and caffeine. It is postulated that the adhesive pad could be utilized for sustained release and/or delivery of nicotine for the purpose of assisting with smoking cessation. It is also postulated that the adhesive pad could be utilized for sustained release and/or delivery of caffeine to increase alertness and improve physical activity.

It will be appreciated that the above lists only exemplify a few of the components that can be used in the adhesive pad, and the person skilled in the art will readily appreciate that other substitutes not expressly listed herein could be utilized in the adhesive pad.

As mentioned above, the adhesive pad may be provided in a number of forms. In this regard, the adhesive pad may be provided as a solid pad, a paste, or a powder that can be reconstituted to form a paste. The consumer can then utilize an amount of the paste to form a pad with the desired size and/or shape. The adhesive pad may be provided as a compressed particulate tablet.

The adhesive pad may be in the form of a shape. The adhesive pad may be square, squircle, circular, rectangular, oval, star shaped or any other shape. The thickness of the adhesive pad may suitably be between 0.1 mm and 10 mm, more suitably between 1 mm and about 5 mm, preferably between about 2 mm and 4 mm, and most preferably between about 2 mm or about 3 mm.

As mentioned hereinabove, the adhesive pad can be used intra-orally and in the oral cavity. The adhesive pad can suitably be used in myofunctional training. The adhesive pad can be placed in the oral cavity and may slowly dissolve over a number of hours depending on the location of the adhesive pad. The time required to achieve complete dissolution is influenced by both the composition and the location of application.

The adhesive pads preferably have a solid texture or soft semi-solid texture. The adhesive pads suitably have adhesive surfaces which become sticky or tacky upon contact with a moist surface. These adhesive surfaces adhere to moist body surfaces.

In a second aspect, the invention resides in a method of myofunctionally training a subject including the steps of:
 a. providing an adhesive pad comprising one or more hydrocolloids selected from the group consisting of cellulose, starch, polysaccharides, gelatin and gums; and
 b. adhering the adhesive pad to a surface in an oral cavity of the subject.
 to myofunctionally train the subject.

The features and components of the adhesive pad are as substantially described for the first aspect. In particular, the adhesive pad comprises cellulose; and one or more hydrocolloids selected from the group consisting of starch, polysaccharides, gelatin and gums.

In an embodiment, the cellulose is a carboxymethyl cellulose or alkali metal derivative thereof.

Complete dissolution of the adhesive pad, in the oral cavity, is achieved in suitably greater than 30 minutes, suitably greater than 1 hour, more suitable greater than 2 hours, preferably greater than 3 hours, more preferably greater than 4 hours, and most preferably greater than 5 hours. In one embodiment, complete dissolution of the adhesive pad, in the oral cavity, is achieved between 30 minutes and 2 hours. In one embodiment, the adhesive pad during myofunctional therapy, complete dissolution of the adhesive pad in the oral cavity is achieved in about 1 hour. The longer timeframes may be desirable for drug delivery purposes.

The adhesive pad can be adhered to the palate, the upper or lower gum, between the gum and cheek, between the gum and lips or under the tongue of the subject. By placing the adhesive pad in these locations, the tongue of the subject can be trained to touch the adhered adhesive pads to strengthen the desired muscles to maintain a desired tongue positioning, posture and/or movement. In this regard, the subject's tongue may continually touch the pad until it dissolves to thereby strengthening the desired muscles in the tongue. In one embodiment, the method further includes the step of having the subject touch the adhered adhesive pad with their tongue. The presence of the adhesive pad can subconsciously facilitate the tongue to touch the adhesive pad. Alternatively, the subject may consciously and deliberately touch the adhesive pad with their tongue. This training of the tongue alleviates the problem of having an abnormal tongue positioning, posture and/or movement, and thus the previously mentioned problems. The adhesive pad may be placed in any location in the mouth or oral cavity to train the desired part of the tongue. It should be clear that the adhesive pad can be used in myofunctional training. It will be appreciated that step (c) may include the step of repeatedly touching the adhesive pad with the tongue.

Myofunctional training can be utilized to train the tongue, and this in turn can alleviate a number of ailments. In this regard, the adhesive pad can be used to assist in the treatment of tongue thrust, open bite malocclusion, oral malocclusions, habitual digit sucking, sleep apnea, snoring and dysphagia. Furthermore, the adhesive pad can be used to promote nasal breathing, prevent relapse of lingual frenulum after removal of the tongue-tie and inducing saliva secretion.

In one embodiment, the invention resides in a method of treating and/or preventing and/or alleviating tongue thrust, open bite malocclusion, oral malocclusions, habitual digit sucking, sleep apnea, snoring and dysphagia. In certain embodiments, the invention resides in a method of promoting nasal breathing, preventing relapse of lingual frenulum after removal of the tongue-tie and inducing saliva secretion.

In embodiments, the myofunctional training may be orofacial myofunctional training.

One of the major uses of the adhesive pad is to train the tongue to elevate and rest against the palate (more precisely; the incisive papillae behind the midline of the upper central incisors) instead of resting between the mandibular and maxillary teeth and also to train the posterior tongue to elevate against the roof of the mouth. This can be done by placing a pad further back in the palate. This myofunctional training can be achieved through application of the adhesive pad to a location in the mouth (e.g., the palate) which stimulates the tongue to elevate and touch the pad repeatedly until it is dissolved. Repeating such exercises over a period of time can have a range of benefits. Repeating such exercise for 2-4 cycles a day (each cycle continues for ~1 h) for a period of 3-4 months can have a range of benefits that are important for treatment.

Application of the adhesive pad to the palate stimulates the tongue to elevate and touch the pad repeatedly until it is complete dissolved. As such, the tongue is trained to rest on the palate of the mouth and this can alleviate anterior open bite and tongue thrust. Furthermore, as the tongue rests against the palate it can expand the maxilla by applying a slow and consistent force to the tongue side surfaces of the teeth, and this can aid in the treatment of crooked teeth. This is achieved by spreading the teeth and bringing them into alignment.

Application of the adhesive pad to the palate can also be an effective intervention in habitual digit sucking and prolonged use of pacifiers. The use of the adhesive pad on the palate of the mouth promotes raising the tongue to the roof of the mouth and mouth closure. As such, the tongue prevents the digit or pacifier from entering the mouth. Furthermore, with the tongue resting on the roof of the mouth it becomes difficult to breathe there through, and so the subject will be encouraged to breathe through the nose. This will alleviate the problem of sleep apnea and snoring for similar reasons.

Dysphagia can also be alleviated through myofunctional training with the adhesive pads. In this regard, dysphagia is a term used to describe difficulty in swallowing. This can occur due to tongue muscle weakness or fatigue. Myofunctional training with the adhesive pads can increase the tongue muscle tone and strength to alleviate this problem.

After removal of a tongue tie, the subject is generally prescribed tongue exercises to prevent reformation of the tongue-tie during the healing phase. The adhesive pads can be used after surgery to stimulate movement of the tongue to the roof of the mouth to prevent reformation of the tongue tie.

Saliva is important in the maintenance of oral health. Saliva not only protects the teeth and oropharyngeal mucosa, it also facilitates articulation of speech and is imperative for mastication and swallowing. A large number of diseases and medication can affect saliva secretion through different mechanisms leading to salivary gland dysfunction and associated oral problems such as xerostomia, dental caries and fungal infections. The adhesive pads can promote the production of saliva over an extended period of time, and this will alleviate the above problems.

It is postulated that, while the adhesive pad is on the palate and the tongue is raised to the roof of the mouth, eating will be deterred and so the present adhesive pads can be used to treat over eating habits.

The adhesive pads can also be used in speech therapy through myofunctional training. Tongue movement and contact points of the tongue with the palate are different in the pronunciation of different words and/or letters. Tongue movement can be affected by tongue malfunction. In this regard, myofunctional training with the adhesive pads can be used to train particular tongue muscles and thus addresses or alleviates this issue. For instance, the adhesive pads can be placed in specific areas of the mouth to guide the tongue to the correct areas of the mouth to correct pronunciation.

Finally, the adhesive pads can be used for intra-oral active agent delivery that can be optimized to achieve either local or systemic active agent release. The adhesive pads can be utilized for localized and sustained active agent release. Oral administration, wherein the active agent is directly absorbed by the buccal mucosa to the blood stream, provides bioavailability and rapid onset of action of systemic drugs, where the absorbed drug enters the blood circulation without being metabolized in the liver. In this regard, the adhesive pad may specifically be applied to the oral cavity, in certain embodiments this may be the buccal cavity and/or the palate. Placement of the adhesive pad in the oral cavity, in some embodiments the buccal cavity and/or the palate, is suitable for slow release of the active agent. As such, the adhesive pad could be utilized as vehicles for sustained active agent release.

It will be appreciated by the person skilled in the art that the adhesive pads can be used to treat tongue related ailments and active agent delivery.

It will be appreciated that the adhesive pads discussed above can be used in combination with oral appliances or devices. As used herein, the term 'oral appliance or device' refers to devices and/or appliances that are designed to be placed in the oral cavity.

It is postulated that the combination of the adhesive pads and an oral appliance or device could have a synergistic effect in myofunctional training. In this regard, the adhesive pads may be adhered to a surface of an appliance or device for use in the oral cavity to correct tongue position. The appliance or device itself, absent the adhesive pad, may be designed for a separate function within the oral cavity, such as to straighten teeth.

In one aspect, the invention resides in the use of a combination of an oral appliance or device and an adhesive pad comprising one or more hydrocolloids selected from the group consisting of cellulose, starch, polysaccharides, gelatin and gums in myofunctional training.

In another aspect, the invention resides in an oral appliance or device having an adhesive pad comprising one or more hydrocolloids selected from the group consisting of cellulose, starch, polysaccharides, gelatin and gums adhered to a surface thereof.

In yet another aspect, the invention resides in a method of myofunctionally training a subject including the steps of:
a. providing an adhesive pad comprising one or more hydrocolloids selected from the group consisting of cellulose, starch, polysaccharides, gelatin and gums; and
b. adhering the adhesive pad to a surface of an oral appliance or device;
to thereby myofunctionally train the subject.

The adhesive pad and components thereof in relation to the above aspects are as substantially described hereinabove.

In particular, the adhesive pad comprises cellulose; and one or more hydrocolloids selected from the group consisting of starch, polysaccharides, gelatin and gums.

In an embodiment, the cellulose is a carboxymethyl cellulose or alkali metal derivative thereof.

In one embodiment, the method further includes step c. placing the oral appliance or device in an oral cavity of the subject.

In another embodiment, step b. occurs with the oral appliance or device in the oral cavity.

Figure 5:
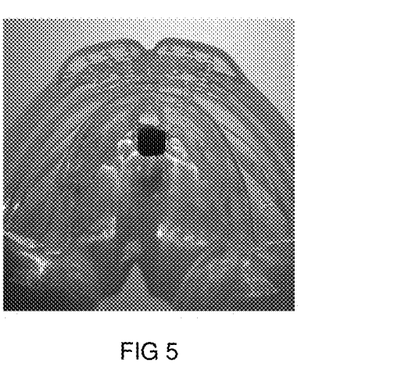
FIG. 5 shows the adhesive pad adhered an oral device.
Figure 6:
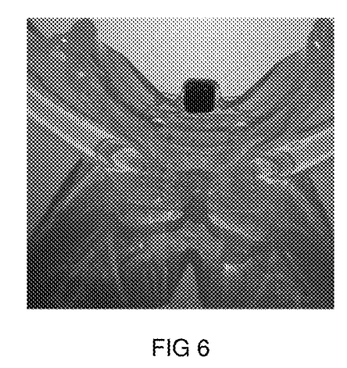
FIG. 6 show the adhesive pad adhered to another oral device.

In one non-limiting example, the adhesive pad may be attached to a pre-fabricated myobrace. The adhesive pad may be attached to different surfaces of the myobrace (shown in FIGS. 5 and 6). In one embodiment, the adhesive pad is adhered to a tongue tag of the myobrace. The tongue tag of the myobrace has the purpose of enticing the tongue to rise up to the roof of the mouth to thereby myofunctionally train the subject. As such, the combination of the adhesive pad and a myobrace may improve the efficiency of myofunctional training when compared to the use of a myobrace alone. Other non-limiting examples of the oral appliance or device include orthodontic appliances and devices, and custom made oral appliances. Non-limiting examples of the orthodontic appliances include removable orthodontic appliances. Non-limiting examples of the removable orthodontic appliances include bioblocs, Twin-Blocs and Invisalign. Other oral appliances or devices include but are not limited to Myobrace and Myo Munchee. It will be appreciated that the adhesive pads can also be applied to a non-orthodontic appliance or device such as a mouth guard and/or an oral myology training apparatus.

It will be appreciated that, when the adhesive pad is provided in the form of a powder, the method of myofunctionally training a subject further includes the step of reconstituting the powder with a liquid. The reconstituted powder is generally a paste.

In addition to the above, it will be appreciated that when the adhesive pad is in the form of a paste then the method will further include the step of molding the adhesive pad. The adhesive pad may be molded to the consumers preference. Molding refers to the consumer shaping the paste into the desired dimensions.

EXAMPLES

Example 1—Example Compositions

Adhesive pads were prepared containing the relative amounts of components shown in Table 1. The adhesive pads were prepared by the process described in Example 2, 2A, 2B and 2C.

TABLE 1

| | Example compositions | | | | | | | |
|---|---|---|---|---|---|---|---|---|
| Component | Example 1 | Example 2 | Example 3 | Example 4 | Example 5 | Example 6 | Example 7 | Example 8 |
| Hydrocollid | | | | | | | | |
| Sodium CMC | 20% | 30% | 35% | 30% | 20% | 20% | 15% | 15% |
| Agar | 20% | — | — | 35% | 15% | 20% | 20% | 20% |
| Pectin | — | 35% | — | — | 15% | — | — | — |
| Gelatin | — | — | 35% | — | — | — | — | — |
| Guar gum | — | 35% | — | 35% | — | — | — | — |
| Xanthan gum | 20% | — | 30% | — | 20% | 20% | 15% | 15% |
| Additives | | | | | | | | |
| Glycerol | 40% | — | — | — | 30% | 40% | 45% | 45% |
| Medicine | — | — | — | — | — | Vitamin D | Vitamin C 5% | Zinc gluconate 5% |
| Preservative | Sodium Propionate | Sodium Propionate | Sodium Benzoate | Sodium Benzoate | Sodium Propionate | Sodium Propionate | Sodium Propionate | Sodium Propionate |
| Sweetener | Stevia | Sucralose | Sucralose | Stevia | Sucralose | Stevia | Sucralose | Sucralose |
| Colouring agent | Red | Red | Blue | Green | Red | Yellow | Green | Yellow |
| Flavouring agent | Raspberry | Raspberry | Passion fruit | Passion fruit | Raspberry | Lime | Lime | Passion fruit |

Example 2—Example Manufacturing Process of an Adhesive Pad that is Ready-for-Use The following working steps were taken to produce the adhesive pads that are ready-for-use with the relative amounts as set out in table 1:
  a. adding the solvent to a suitably sized vessel;
  b. heating the solvent to about 60° C.;
  c. adding the relative amounts of components as set out in table 1 to the solvent;
  d. mixing for about 20 minutes at 60° C.;
  e. placing the mixture between two plates heated to about 140° C. to form a sheet;
  f. cutting the sheet into the desired dimensions.

Figure 1:
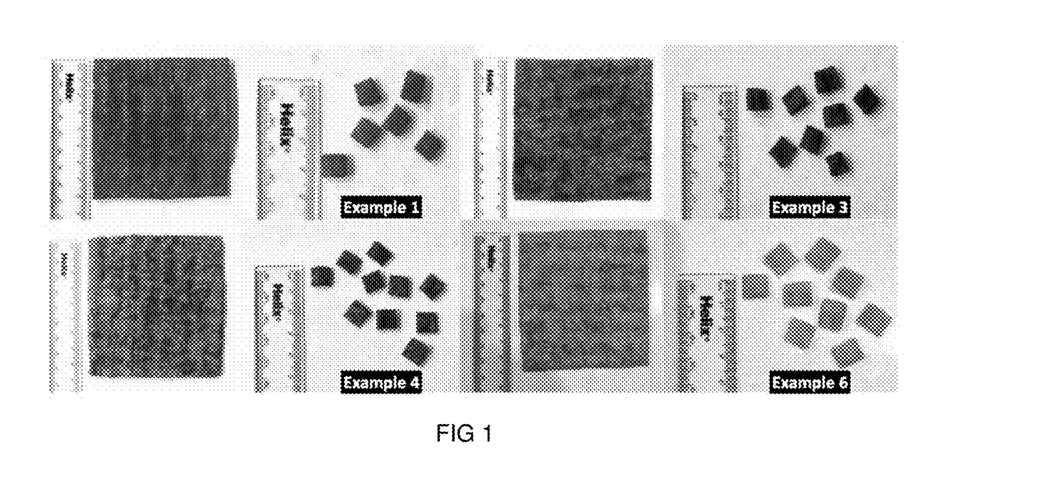
FIG. 1 shows selected examples (Examples 1, 3, 4 and 6) of the adhesive pad.

Examples of the adhesive pad described in Example 1, 3, 4 and 6 are shown in FIG. 1.

Example 2A—Alternate Manufacturing Process of an Adhesive Pad that is Ready-for-Use The following working steps were taken to produce the adhesive pads that are ready-for-use with the relative amounts as set out in table 1:
  a. adding the solid components to a suitably sized vessel;
  b. mixing the solid components to form a solid mixture;
  c. adding the liquid components to a different suitably sized vessel;
  d. mixing the liquid components to form a liquid mixture;
  e. transferring and mixing the solid mixture and the liquid mixture in a wet granulation facility to from granules; and
  f. compressing the granules using a conventional tablet press into the desired dimensions.

Figure 7:
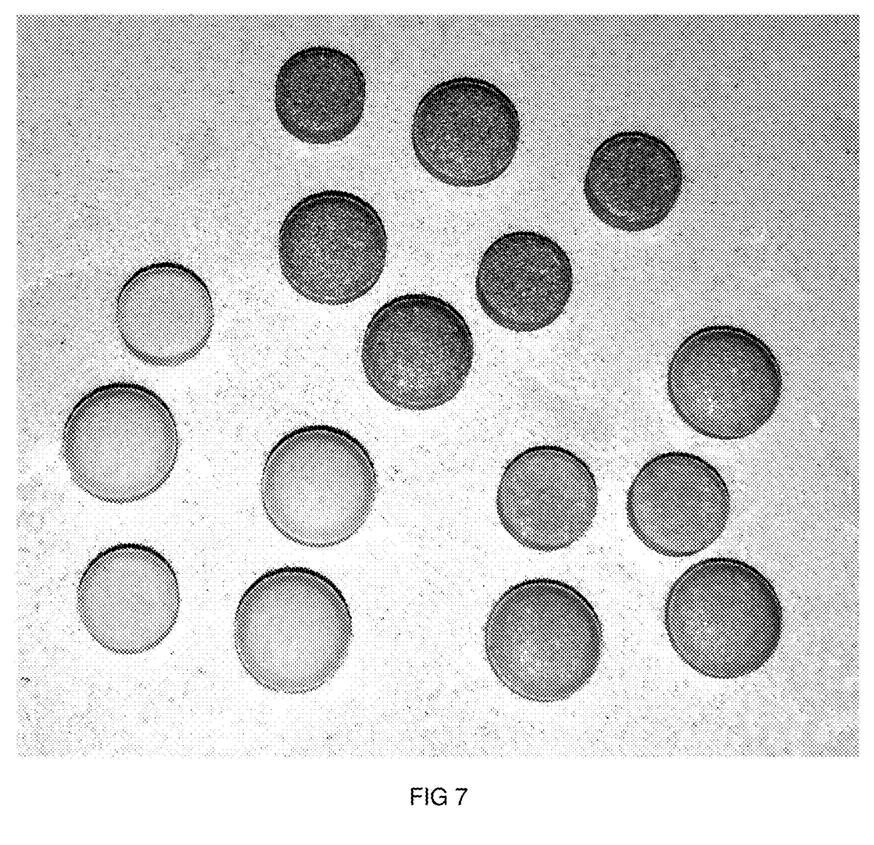
FIG. 7 shows circular adhesive pads (with different colouring) produced by a conventional tablet machine.

The use of a conventional tablet press allows the formation of ready-for-use adhesive pads. Examples of the adhesive pads formed in this manner are shown in FIG. 7.

Example 2B—Manufacturing Process for an Adhesive Pad in the Form of a Solid

The following working steps were taken to produce the adhesive pads in the form of a solid with the relative amounts as set out in table 1:
a. adding the solid components to a suitably sized vessel;
b. mixing the solid components to form a solid mixture; and
c. compressing the solid mixture into solid tablets using a tablet press.

Example 2C—Manufacturing Process of an Adhesive Pad that is Ready-for-Use

The following working steps were taken to produce the adhesive pads that are ready-for-use with the relative amounts as set out in table 1:
a. adding the solvent to a suitably sized vessel;
b. heating the solvent to about 60° C.;
c. adding the relative amounts of components as set out in table 1 to the solvent;
d. mixing for about 20 minutes at 60° C.;
e. pressing the plates between two compression plates to form thin sheets;
f. drying the sheets at about 60° C. for about 2-3 hours;
g. cutting the sheet into the desired dimensions.

Example 3—Application of the Adhesive Pad

Figure 8A:
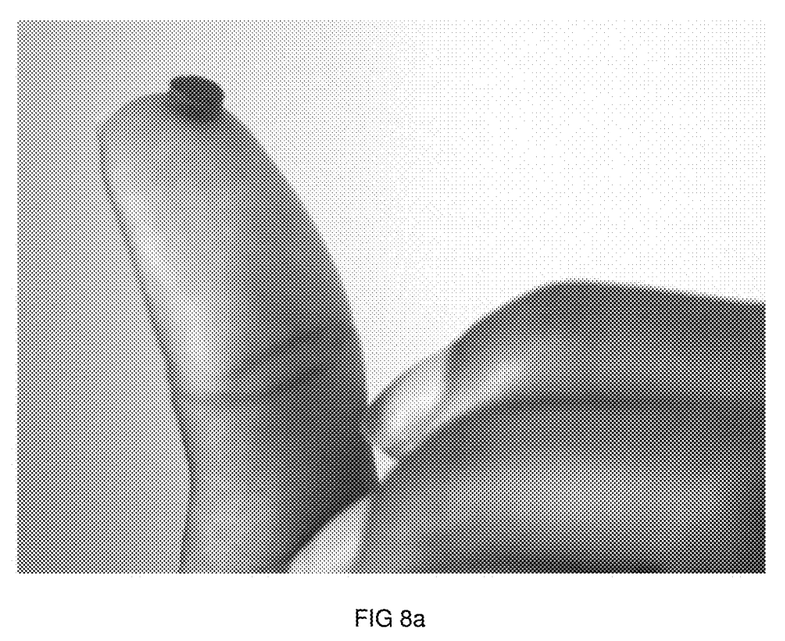
FIG. 8a-c shows the steps of applying the adhesive pad to the hard palate.
Figure 8B:
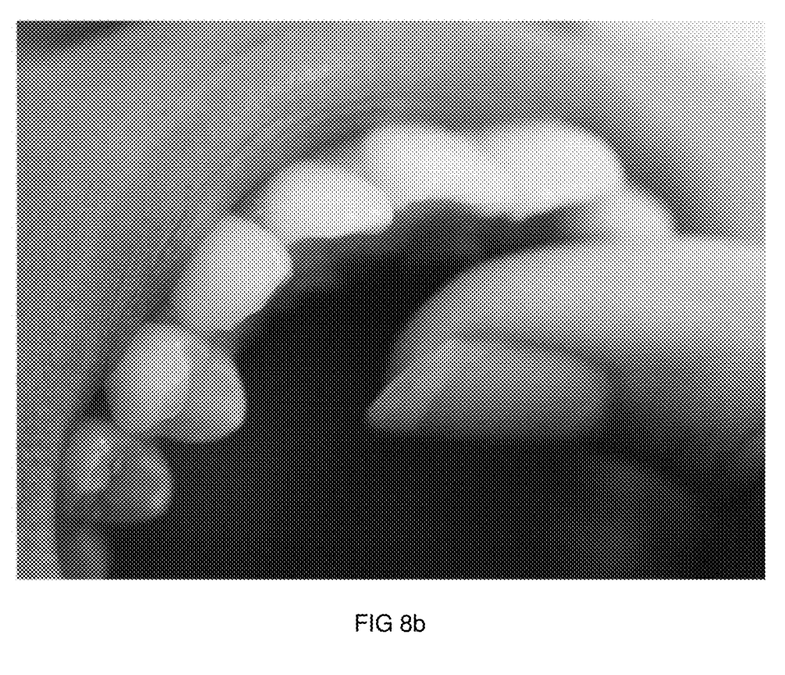
Figure 8C:
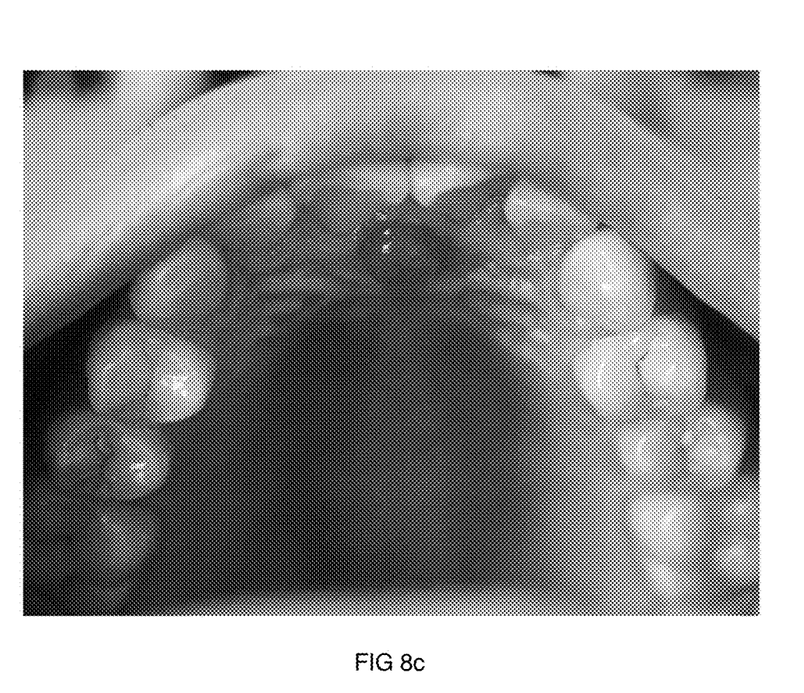

As shown in FIG. 8a, the adhesive pad may first be placed on the finger or digit. The adhesive pad may then be placed on the palate of the subject to be treated (FIG. 8b). The adhesive pad will then remain adhered to the palate (as shown in FIG. 8c) until it is completely dissolved.

Example 4—Further Example Composition

Adhesive pads were prepared containing the relative amounts of components shown in Table 2.

TABLE 2

Further example composition

| Component | Percentage |
|---|---|
| Sodium carboxymethylcellulose | 31.5% |
| Agar | 31.5% |
| Xanthan gum | 31.5% |
| Stevia (sweetener) | 0.6% |
| Potassium sorbate (Preservative) | 0.2% |
| Natural colour | 1.2% |
| Natural flavour | 2.5% |
| Glidant (Glyceryl dibehenate) | 1.0% |
| Total | 100% |

This composition according to Table 2 was used in the manufacture of adhesive pads. The manufacturing process utilized wet granulation and a tablet press. The powder was converted into granules by spraying the powder mix with water/alcohol spray, followed by drying the resultant granules, then compression in a tablet press to form the adhesive pads (for instance circular pads).

Dissolution Testing

Dissolution of some of the Examples of the adhesive pads described herein were tested.

Figure 2:
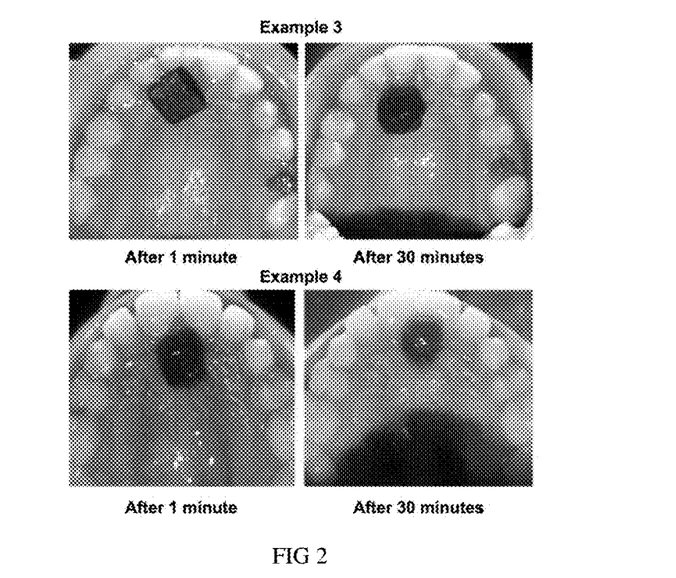
FIG. 2 shows Examples 3 and 4 of FIG. 1 applied to the palate of a subject after 1 minute and 30 minutes.

The adhesive pad of Examples 3 and 4 described above were applied to the palate of the subject and monitored at 1 minute after application and 30 minutes after application. FIG. 2 shows the amount of dissolution of the adhesive pad of Examples 3 and 4 at these time points. As shown in FIG. 2, the adhesive pads of Examples 3 and 4 were not completely dissolved at 30 minutes after application. Complete dissolution of the adhesive pad of Example 3 was achieved after 78 minutes. Complete dissolution of the adhesive pad of Example 4 was achieved after 62 minutes.

Figure 3:
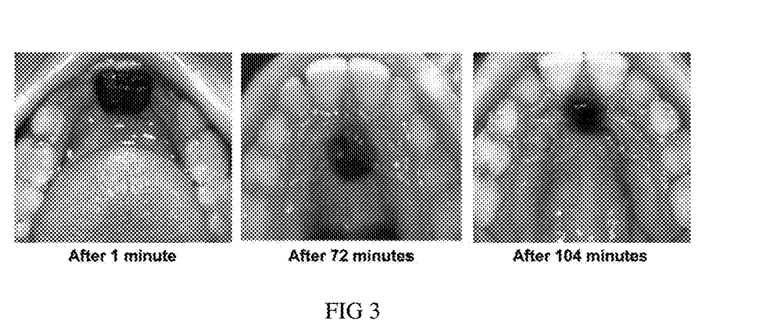
FIG. 3 shows Example 7 at 1 minute, 72 minutes and 104 minutes after application to the palate of a subject.

Dissolution of the adhesive pad of Example 7, which contains vitamin C, was also tested. The adhesive pad was applied to the palate of the subject and monitored at 1 minute after application, at 72 minutes after application and 104 minutes after application. FIG. 3 shows the amount of dissolution of the adhesive pad of Example 7 at these time points. As shown in FIG. 3, the adhesive pad of Example 7 did not dissolve completely after 104 minutes after application. Complete dissolution of the adhesive pad of Example 7 was achieved after 123 minutes.

Figure 4:
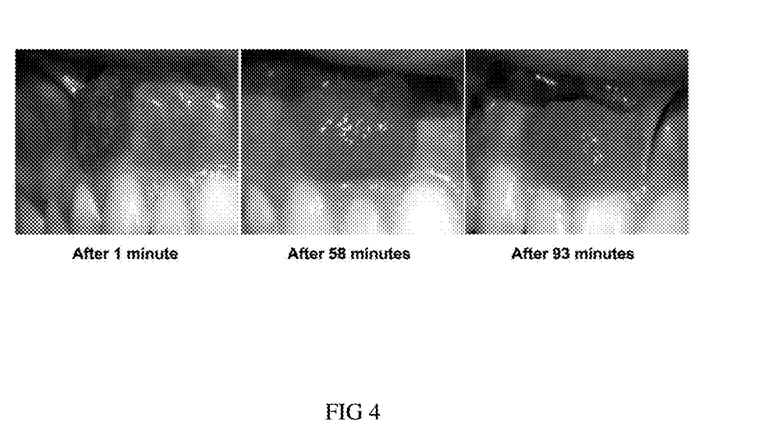
FIG. 4 shows Example 8 at 1 minute, 58 minutes and 93 minutes after application to the palate of a subject.

Dissolution of the adhesive pad of Example 8, which contains zinc gluconate, was also tested. The adhesive pad was applied between the upper gum and cheek of the subject and monitored at 1 minute after application, at 58 minutes after application and 93 minutes after application. FIG. 4 shows the amount of dissolution of the adhesive pad of Example 8 at these time points. As shown in FIG. 4, the adhesive pad of Example 8 did not dissolve completely after 93 minutes after application. Complete dissolution of the adhesive pad of Example 8 was achieved after 5 hours and 30 minutes.

Example Manufacturing Process of an Adhesive Pad Provided in the Form of a Paste The following working steps were taken to produce the adhesive pads in the form of a paste with the relative amounts as set out in table 1:
a. adding the solvent to a suitably sized vessel;
b. heating the solvent to about 60° C.;
c. adding the relative amounts of components as set out in table 1 to the solvent; and
d. mixing for about 20 minutes at 60° C.;

Sustained Drug Release

In Examples 6, 7 and 8, adhesive pads comprising an active agent were prepared. In Example 6, vitamin D was loaded into the solid matrix of the adhesive pad, where each adhesive pad contained ~500 IU of the vitamin. In Example 7, vitamin C (sodium ascorbate) was loaded at about 5% by weight of the adhesive pad. In Example 8, zinc gluconate was loaded at about 5% by weight of the adhesive pad.

The adhesive pads in Examples 7 and 8 contained about 15 mg of the active agent (vitamin C and zinc gluconate in Examples 7 and 8, respectively). The rate of the adhesive pad dissolution, and consequently the rate of active agent release, was examined at different spots in the oral cavity. When the adhesive pad was placed on the palate, complete dissociation was achieved within 2 h. A more sustained and extended release rate was achieved by placing the adhesive pad between the gum and the cheek where the adhesive pad dissociated over a period of 5 h and 30 minutes.

It should be clear that the adhesive pads can be used as vehicles for sustained active agent delivery of various natural, synthetic and semisynthetic active agents. The active agent can be either in a solid or liquid state (as liquids can be loaded into the solid matrix of the pad). The adhesive pads comprising active agent(s) can be intended either for local intra-oral drug delivery or for systemic effect through absorption from the buccal mucosa.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A method of myofunctionally training a subject comprising adhering an intra-oral adhesive pad to the palate of the subject's oral cavity to stimulate the subject's tongue to elevate and touch the adhesive pad repeatedly, the adhesive pad comprising:
   a) carboxymethyl cellulose, or an alkali metal derivative thereof, in an amount of between 10% to 40% by weight; and
   b) two or more hydrocolloids, in a combined amount between 35% and 70% by weight, selected from the group consisting of: (i) a starch; (ii) agar and/or pectin; (iii) gelatin; and (iv) a gum selected from the group consisting of guar gum, karaya gum, xanthan gum, gum acacia, gum Arabic, locust bean gum, and combinations thereof;
   wherein complete dissolution of the adhesive pad in the subject's oral cavity is achieved in between 30 minutes and 2 hours;
   wherein the thickness of the adhesive pad is between 0.1 mm and 5 mm; and
   wherein the adhesive pad is attached to the subject's palate for at least 30 minutes.

2. The method of claim 1, wherein the starch is a carboxymethyl starch.

3. The method of claim 1, further comprising one or more of colouring agents, flavouring agents, sweeteners, preservatives, oils, glidants, and/or active agents.

4. The method of claim 1, wherein the adhesive pad is formed using wet granulation.

5. A method of myofunctionally training a subject comprising adhering an intra-oral adhesive pad to the palate of the subject's oral cavity to stimulate the subject's tongue to elevate and touch the adhesive pad repeatedly, the adhesive pad comprising:
   sodium carboxymethyl cellulose in an amount of about 20%, agar in an amount of about 20%, xanthan gum in an amount of about 20%, and glycerol in an amount of about 40%, by weight of the adhesive pad; or
   sodium carboxymethyl cellulose in an amount of about 30%, pectin in an amount of about 35%, and guar gum in an amount of about 35%, by weight of the adhesive pad; or
   sodium carboxymethyl cellulose in an amount of about 35%, gelatin in an amount of about 35%, and xanthan gum in an amount of about 30%, by weight of the adhesive pad; or
   sodium carboxymethyl cellulose in an amount of about 30%, agar in an amount of about 15%, pectin in an amount of about 15%, and xanthan gum in an amount of about 20%, by weight of the adhesive pad; or
   sodium carboxymethyl cellulose in an amount of about 30%, agar in an amount of about 35%, and guar gum in an amount of about 35%, by weight of the adhesive pad; or
   sodium carboxymethyl cellulose in an amount of about 15%, agar in an amount of about 20%, xanthan gum in an amount of about 15%, and glycerol in an amount of about 45%, by weight of the adhesive pad; or
   sodium carboxymethyl cellulose in an amount of about 30%, agar in an amount of about 30%, xanthan gum in an amount of about 30% by weight of the adhesive pad; or
   sodium carboxymethyl cellulose in an amount of about 31.5%, agar in an amount of about 31.5%, xanthan gum in an amount of about 31.5% by weight of the adhesive pad; or
   sodium carboxymethyl cellulose in an amount of about 10-40%, and agar and xanthan gum in a combined amount of about 5-80% by weight of the adhesive pad; or
   sodium carboxymethyl cellulose in an amount of about 30-35%, and agar and xanthan gum in a combined amount of about 60-65% by weight of the adhesive pad; or
   sodium carboxymethyl cellulose in an amount of about 30-35%, agar and xanthan gum in a combined amount of about 60-65% by weight of the adhesive pad, and further comprising one or more of a preservative, a flavouring agent, a colouring agent, a sweetener and a glidant; or
   sodium carboxymethyl cellulose in an amount of about 31.5%, agar in an amount of about 31.5%, xanthan gum in an amount of about 31.5% by weight of the adhesive pad, and further comprising one or more of a preservative, a flavouring agent, a colouring agent, a sweetener and a glidant;
   wherein the thickness of the adhesive pad is between 0.1 mm and 5 mm; and
   wherein the adhesive pad is attached to the subject's palate for at least 30 minutes.

6. The method of claim 5, wherein the thickness of the adhesive pad is between 2 mm and 4 mm.

7. The method of claim 1, wherein the adhesive pad is in the form of a solid pad, a paste, a tablet, a powder that is reconstituted in liquid to form a paste, a powder that is granulated and compressed to form a solid pad, or a powder that is compressed to form a solid pad.

8. The method of claim 7, wherein the powder is compressed to form a solid pad.

9. The method of claim 1, wherein the two or more hydrocolloids are selected from the group consisting of: (i) a carboxymethyl starch; (ii) agar and/or pectin; and (iii) a gum selected from the group consisting of guar gum, karaya gum, xanthan gum, gum acacia, gum arabic and locust bean gum.

10. The method of claim 9, wherein the two or more hydrocolloids are selected from the group consisting of: (i) agar; and (ii) a gum which is guar gum and/or xanthan gum.

11. The method of claim 10, wherein the gum is xanthan gum.

12. The method of claim 11, wherein the adhesive pad comprises sodium carboxymethyl cellulose in an amount of about 31.5%, agar in an amount of about 31.5%, and xanthan gum in an amount of about 31.5% by weight of the adhesive pad.

13. A method of myofunctionally training a subject comprising adhering an intra-oral adhesive pad to the palate of the subject's oral cavity to stimulate the subject's tongue to elevate and touch the adhesive pad repeatedly, the adhesive pad comprising:
- (a) carboxymethyl cellulose, or an alkali metal derivative thereof, in an amount of between 10% to 40% by weight; and
- (b) two or more hydrocolloids, in a combined amount between 35% and 70% by weight, selected from the group consisting of: (i) a carboxymethyl starch; (ii) agar and/or pectin; and (iii) guar gum and/or xanthan gum;

wherein complete dissolution of the adhesive pad in the subject's oral cavity is achieved, while the subject is awake, in between 30 minutes and 2 hours and the adhesive pad remains adhered to the subject's palate throughout this dissolution;

wherein the thickness of the adhesive pad is between 0.1 mm and 5 mm; and wherein the adhesive pad is attached to the subject's palate for at least 30 minutes.

14. The method of claim 13, wherein the carboxymethyl cellulose is sodium carboxymethyl cellulose and the two or more hydrocolloids are agar and xanthan gum.

* * * * *